(12) United States Patent
Kamamoto et al.

(10) Patent No.: US 9,664,230 B2
(45) Date of Patent: May 30, 2017

(54) TAPER ROLLER BEARING

(71) Applicant: JTEKT CORPORATION, Osaka-shi, Osaka (JP)

(72) Inventors: Shigeo Kamamoto, Kashiwara (JP); Junji Murata, Kashiba (JP)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 14/784,847

(22) PCT Filed: Mar. 31, 2014

(86) PCT No.: PCT/JP2014/059402
§ 371 (c)(1),
(2) Date: Oct. 15, 2015

(87) PCT Pub. No.: WO2014/175000
PCT Pub. Date: Oct. 30, 2014

(65) Prior Publication Data
US 2016/0061259 A1    Mar. 3, 2016

(30) Foreign Application Priority Data

Apr. 23, 2013 (JP) .................................. 2013-090440

(51) Int. Cl.
*F16C 33/58* (2006.01)
*F16C 33/46* (2006.01)
(Continued)

(52) U.S. Cl.
CPC ........ *F16C 33/4605* (2013.01); *F16C 19/364* (2013.01); *F16C 33/366* (2013.01);
(Continued)

(58) Field of Classification Search
CPC ...... F16C 13/36; F16C 13/364; F16C 33/366; F16C 33/4605; F16C 33/4623;
(Continued)

(56) References Cited

U.S. PATENT DOCUMENTS 3,251,118 A * 5/1966 Pitner ................. F16C 33/4676
384/575
4,664,537 A * 5/1987 Ascheron ............. F16C 19/364
384/470
(Continued)

FOREIGN PATENT DOCUMENTS

CN    102171468 A    8/2011
CN    102770676 A    11/2012
(Continued)

OTHER PUBLICATIONS

Jul. 1, 2014 International Search Report issued in International Patent Application No. PCT/JP2014/059402.
(Continued)

*Primary Examiner* — James Pilkington
(74) *Attorney, Agent, or Firm* — Oliff PLC

(57) ABSTRACT

A taper roller bearing includes: an inner ring; an outer ring; taper rollers; and a cage. A first sliding surface is provided in at least one of annular portions of the cage to slide-contact end surfaces of the taper rollers so as to axially position the cage by the end surfaces of the taper rollers. Second sliding surfaces are provided in the pillar portions to slide-contact an outer ring raceway surface so as to radially position the cage by the outer ring raceway surface.

6 Claims, 8 Drawing Sheets

(51) Int. Cl.
- *F16C 33/66* (2006.01)
- *F16C 33/36* (2006.01)
- *F16C 19/36* (2006.01)

(52) U.S. Cl.
CPC ...... *F16C 33/4623* (2013.01); *F16C 33/4682* (2013.01); *F16C 33/6651* (2013.01); *F16C 33/6681* (2013.01); *F16C 2240/46* (2013.01); *F16C 2240/80* (2013.01)

(58) Field of Classification Search
CPC .............. F16C 33/4676; F16C 33/4682; F16C 33/6651; F16C 33/6681; F16C 2240/46; F16C 2240/80
USPC ........................................................ 384/572
See application file for complete search history.

(56) References Cited

U.S. PATENT DOCUMENTS

| | | | |
|---|---|---|---|
| 5,039,231 A | 8/1991 | Kispert et al. | |
| 8,770,853 B2* | 7/2014 | Miyachi | F16C 33/4605 384/572 |
| 8,790,019 B2* | 7/2014 | Fujiwara | F16C 33/4605 384/572 |
| 2012/0263405 A1 | 10/2012 | Mizuki et al. | |
| 2012/0321237 A1 | 12/2012 | Usuki et al. | |

FOREIGN PATENT DOCUMENTS

| | | |
|---|---|---|
| JP | H03-69823 A | 3/1991 |
| JP | 2004-084799 A | 3/2004 |
| JP | 4151347 B2 | 9/2008 |
| JP | 2009-041651 A | 2/2009 |
| JP | 2012-241873 A | 12/2012 |
| JP | 2012-241874 A | 12/2012 |

OTHER PUBLICATIONS

Mar. 2, 2017 Office Action issued in Chinese Patent Application No. 201480022496.0.

* cited by examiner

TAPER ROLLER BEARING

TECHNICAL FIELD

One aspect of the present invention relates to a taper roller bearing.

BACKGROUND ART

A taper roller bearing has a feature of higher load capacity and higher rigidity than other rolling bearings of the same size.

FIG. 7 is an axially sectional view showing a taper roller bearing in the related art. FIG. 8 is a radially sectional view of the taper roller bearing in FIG. 7. As shown in FIG. 7 and FIG. 8, a taper roller bearing 100 includes an inner ring 101, an outer ring 102, a plurality of taper rollers 103 rotatably arranged between the inner and outer rings 101 and 102, and an annular cage 104 retaining the taper rollers 103 circumferentially at equal intervals (for example, see Patent Document 1).

The cage 104 includes a small diameter annular portion 105, a large diameter annular portion 106, and a plurality of pillar portions 107 which connect the two annular portions 105 and 106. In the cage 104, pockets 108 for receiving the taper rollers 103 are formed by the two annular portions 105 and 106 and adjacent ones of the pillar portions 107.

The cage 104 is positioned axially and radially by the taper rollers 103 respectively received in the pockets 108, while keeping the intervals between adjacent ones of the taper rollers 103.

To this end, the circumferential width of each pocket 108 is set to be smaller than the diameter of each taper roller 103 such that the taper roller 103 is received in the pocket 108 while sliding on the pillar portions 107, as shown in FIG. 8. The cage 104 is positioned radially when rolling surfaces 103a of the taper rollers 103 slide-contact the pillar portions 107, respectively.

In addition, inner side surfaces 108a of the pillar portions 107 on which the taper rollers 103 slide are formed into concave curved surfaces extending along the rolling surfaces 103a of the taper rollers 103, respectively, as shown in FIG. 8, such that the cage 104 is positioned accurately by the taper rollers 103.

RELATED ART DOCUMENTS

Patent Documents

Patent Document 1: Japanese Patent No. 4151347

SUMMARY OF THE INVENTION

Problem to be Solved by the Invention

In the related-art taper roller bearing, as described above, the cage 104 is positioned axially and radially by the taper rollers 103 received in the pockets 108 and turning on their axes individually between the inner and outer rings 101 and 102. Therefore, some of the taper rollers 103 may bite the pillar portions 107 in the pockets 108 or increase their frictional resistance even if they do not bite the pillar portions 107. Thus, rotational torque may be increased.

Originally the taper roller bearing has comparatively large rotational torque due to a lot of slip sliding parts provided between an end surface of each taper roller 103 and a collar portion 101a or 101b, or the like. In addition thereto, the frictional resistance caused by the cage 104 as described above also causes increase in the rotational torque.

Further, when the taper roller bearing is rotated at a high velocity, the following fear may arise in addition to the increase in frictional resistance in the sliding parts. That is, the pillar portions 107 of the cage 104 arranged between the taper rollers 103 adjacent to each other may be bitten and caught by the taper rollers 103 rotating at a high velocity. Thus, the cage 104 may be damaged. Therefore, the above-described related-art taper roller bearing also has a problem that it is difficult to rotate the taper roller bearing at a high velocity.

One aspect of the invention has been made in consideration of the foregoing circumstances. An object of the invention is to provide a taper roller bearing capable of reducing rotational torque and rotating at a higher velocity.

Means for Solving the Problem

A first aspect of the invention may include a taper roller bearing including: an inner ring including an inner ring raceway surface; an outer ring which is disposed on an outer circumferential side of the inner ring and coaxially with the inner ring and which includes an outer ring raceway surface opposing the inner ring raceway surface; a plurality of taper rollers rotatably arranged between the inner ring raceway surface and the outer ring raceway surface; and a cage which includes a small diameter annular portion, a large diameter annular portion opposing the small diameter annular portion at a predetermined distance therefrom, and a plurality of pillar portions which connect the annular portions such that spaces each surrounded by adjacent ones of the pillar portions and the annular portions are formed as pockets receiving the taper rollers, respectively, wherein a first sliding surface is provided in at least one of the annular portions to slide-contact end surfaces of the taper rollers so as to axially position the cage by the end surfaces of the taper rollers, and wherein second sliding surfaces are provided in the pillar portions to slide-contact the outer ring raceway surface so as to radially position the cage by the outer ring raceway surface.

According to the taper roller bearing with the configured, the cage is positioned axially by the first sliding surface and positioned radially by the second sliding surfaces. Therefore, the cage does not have to be positioned radially by the plurality of taper rollers, but a suitable clearance can be provided between each pocket and each taper roller. Due to the clearance, sliding friction between each pillar portion and each taper roller can be reduced, and the pillar portion can be suppressed from being bitten by the taper roller. Thus, the rotational torque of the taper roller bearing can be reduced.

Further, since each pillar portion can be suppressed from being bitten by each taper roller as described above, the pillar portion can be suppressed from being caught by the taper roller even when the taper roller bearing rotates at a high velocity. As a result, the taper roller bearing can be rotated at a higher velocity.

A second aspect of the invention may include the taper roller bearing according to the first aspect, wherein the small diameter annular portion closes an annular opening portion formed by a small collar portion provided on one axial end side of the inner ring and one axial end portion of the outer ring, such that slight gaps are secured between the small diameter annular portion and the small collar portion and between the small diameter annular portion and the one axial end portion of the outer ring.

In this case, lubricating oil for lubricating the inside of the taper roller bearing can be limited from flowing into the bearing through the annular opening portion more than necessary, so that it is possible to suppress increase in agitating resistance or the like caused by excessive lubricating oil. It is therefore possible to reduce the rotational torque of the taper roller bearing.

A third aspect of the invention may include the taper roller bearing according to the first or second aspect, wherein the large diameter annular portion closes an annular opening portion formed by a large collar portion provided on the other axial end side of the inner ring and the other axial end portion of the outer ring, such that a slight gap is secured between the large diameter annular portion and the large collar portion.

In this case, lubricating oil flowing into the taper roller bearing can be limited from being discharged to the outside of the bearing through the annular opening portion more than necessary. Thus, the lubricating oil can be retained near a contact portion between the large collar portion and the large diameter side end surface of each taper roller, which slide on each other. It is therefore possible to reduce sliding friction between the large collar portion and each taper roller while it is possible to suppress occurrence of burning or the like.

A fourth aspect of the invention may include the taper roller bearing according to the third aspect, wherein a third sliding surface is provided on an inner circumferential side of the large diameter annular portion to slide-contact an outer circumferential surface of the large collar portion so as to radially position the cage by the outer circumferential surface of the large collar portion. In this case, the cage can be positioned radially by both the outer ring raceway surface and the outer circumferential surface of the large collar portion of the inner ring. Therefore, the cage can be positioned more stably.

Lubricating oil has to be retained on the inner ring side including the large collar portion while increase in agitating resistance, viscous resistance or the like caused by the lubricating oil has to be suppressed on the outer ring side.

Therefore, a fifth aspect of the invention may include the taper roller bearing according to the third or fourth aspect, wherein outer circumferential edges of the pockets in the large diameter annular portion are cut radially inward such that a cut portion through which lubricating oil for lubricating between the inner and outer rings is allowed to be discharged from an inside of the bearing is formed on the outer circumferential side of the large diameter annular portion.

In this case, the lubricating oil that wants to flow out to the outside of the bearing along the outer ring raceway surface can be discharged to the outside quickly. As a result, the lubricating oil can be held moderately on the inner ring side inside the bearing while increase in agitating resistance or the like caused by excessive lubricating oil can be suppressed on the outer ring side. Thus, the rotational torque of the taper roller bearing can be further reduced.

A sixth aspect of the invention may include the taper roller bearing according to any one of the first to fifth aspects, wherein inner side surfaces of the pillar portions facing an inside of the pockets are formed substantially linearly along a radial direction.

In this case, the contact surface between the inner side surface of each pillar portion and each taper roller can be reduced to be as small as possible, while the taper rollers adjacent to each other are separated from each other by the pillar portion. Thus, the frictional resistance can be further reduced.

A seventh aspect of the invention may include the taper roller bearing according to the sixth aspect, wherein radially inner tip ends of the pillar portions are located on a radially inner side of a pitch circle formed by axes of the taper rollers. In this case, adjacent ones of the taper rollers can be retained at a distance from each other by the pillar portions surely, for example, as compared with a case in which the tip ends are located on radially outer sides of the pitch circle.

Advantages of the Invention

According to a taper roller bearing according to one aspect of the invention, rotational torque can be reduced and the bearing can be rotated at a higher velocity.

MODE FOR CARRYING OUT THE INVENTION

Figure 1:
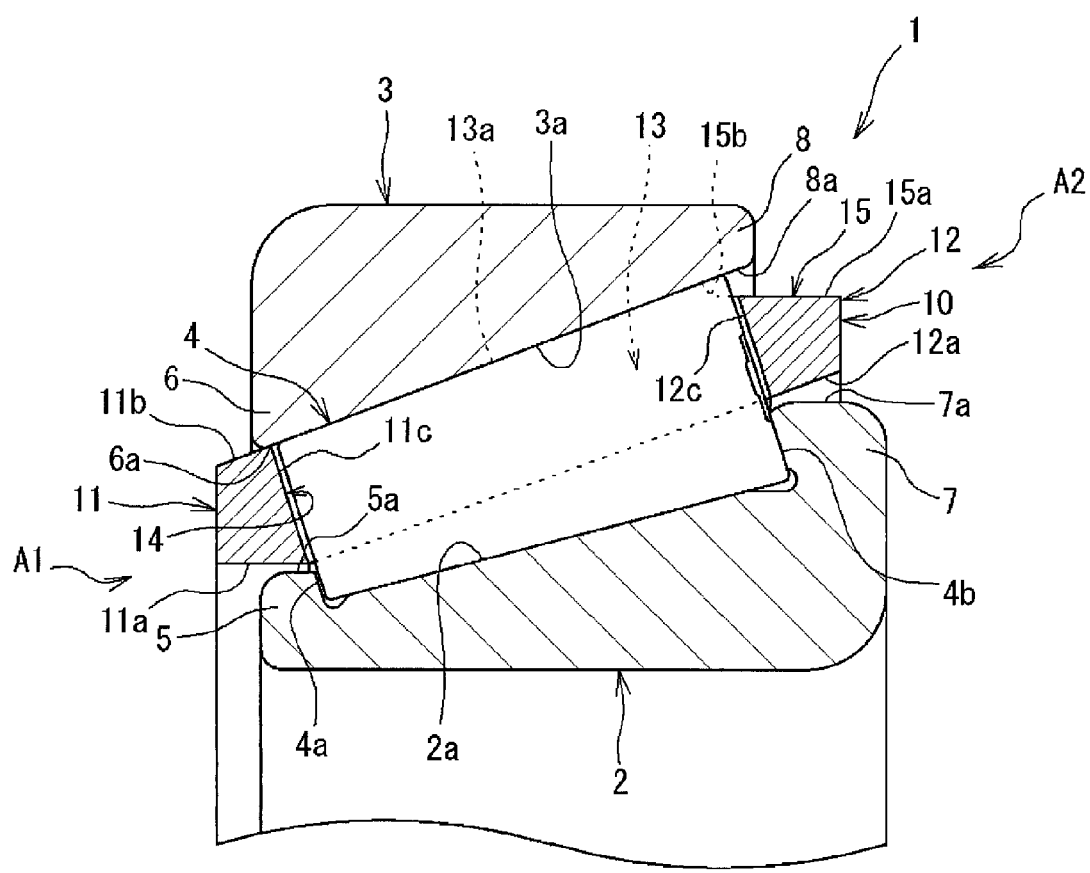
FIG. 1 is an axially sectional view of a taper roller bearing according to an embodiment of the invention.

Next, a preferred embodiment of the invention will be described with reference to the accompanying drawings. FIG. 1 is an axially sectional view of a taper roller bearing according to the embodiment of the invention.

A taper roller bearing 1 has an inner ring 2, an outer ring 3 disposed on the outer circumferential side of the inner ring 2 coaxially therewith, and a plurality taper rollers 4 arrayed between the inner and outer rings 2 and 3.

The inner ring 2 is an annular member formed out of bearing steel, steel for machine structural use, or the like. An inner ring raceway surface 2a is formed in the outer circumference of the inner ring 2 so that the taper rollers 4 can roll on the inner ring raceway surface 2a.

The outer ring 3 is also an annular member formed out of bearing steel, steel for machine structural use, or the like, in the same manner as the inner ring 2. An outer ring raceway surface 3a is formed in the inner circumference of the outer ring 3 so that the outer ring raceway surface 3a can oppose the inner ring raceway surface 2a and the taper rollers 4 can roll on the outer ring raceway surface 3a.

The taper rollers 4 are members formed out of bearing steel or the like. The taper rollers 4 are rotatably arranged between the inner ring raceway surface 2a and the outer ring raceway surface 3a.

In addition, the taper roller bearing 1 has a cage 10 retaining the taper rollers 4.

Figure 2:
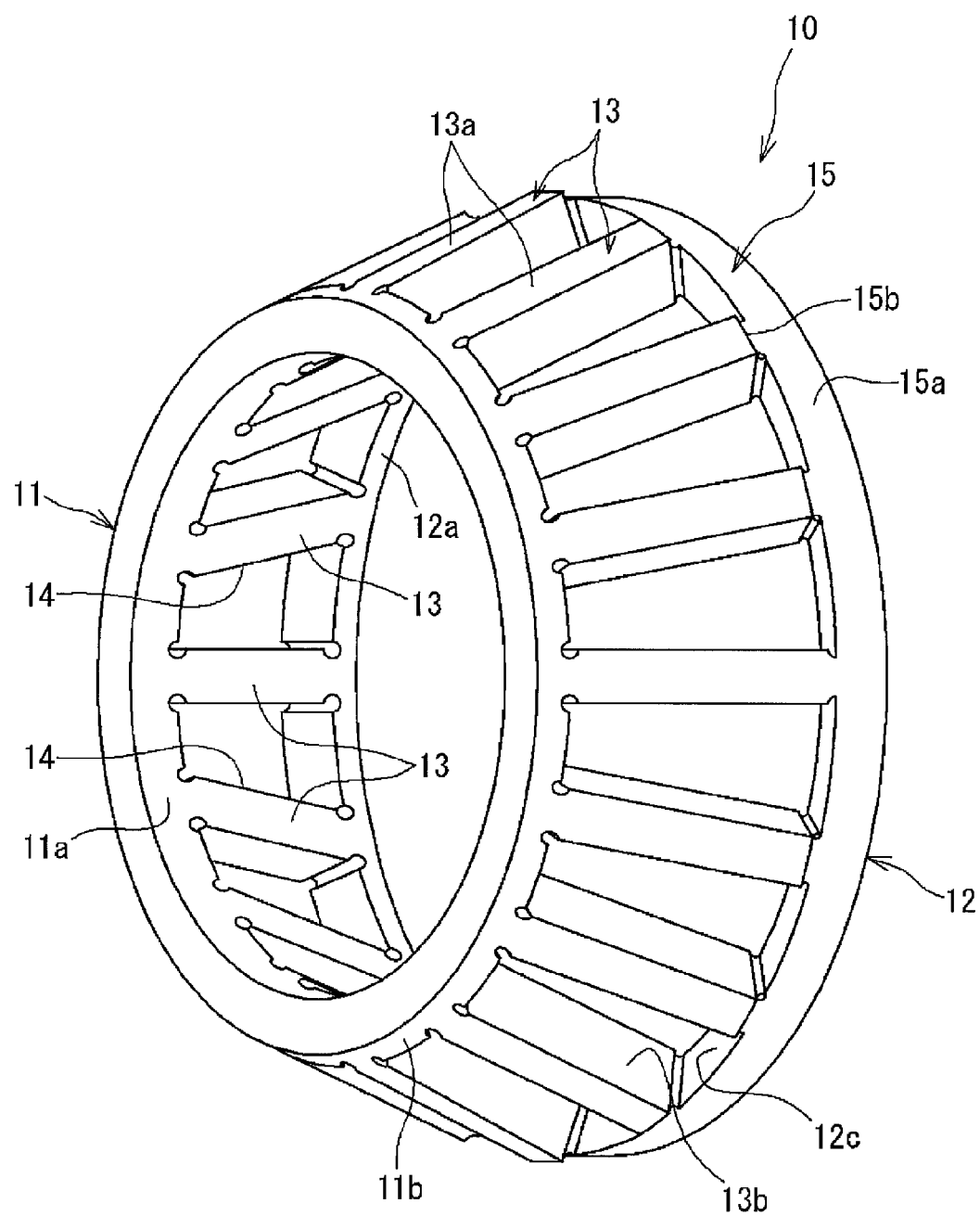
FIG. 2 is a perspective view of a cage.

FIG. 2 is a perspective view of the cage 10. Refer to FIG. 1 as well as FIG. 2. The cage 10 is a member made of synthetic resin and formed by injection molding or the like.

The cage 10 has a pair of annular portions 11 and 12 (a small diameter annular portion 11 and a large diameter annular portion 12) opposing each other at a predetermined distance from each other, and a plurality of pillar portions 13 which are provided circumferentially at predetermined intervals and which connect the annular portions 11 and 12. Spaces surrounded by the paired annular portions 11 and 12 and adjacent two of the pillar portions 13 form pockets 14 for receiving and holding the taper rollers 4 respectively.

The cage 10 is disposed in an annular space between the inner ring 2 and the outer ring 3. The cage 10 receives the taper rollers 4 in the pockets 14 respectively and retains the taper rollers 4 so that the taper rollers 4 can be disposed circumferentially at substantially equal intervals.

Of the two annular portions 11 and 12, annular portion side surfaces 11c and 12c facing the pockets 14 slide-contact two end surfaces 4a and 4b of each taper roller 4 so that the cage 10 can be limited from moving axially. That is, the two annular portions 11 and 12 slide-contact the end surfaces 4a and 4b of the taper rollers 4 so as to position the cage 10 axially.

In this manner, the annular portion side surfaces 11c and 12c of the annular portions 11 and 12 form first sliding surfaces which slide-contact the end surfaces 4a and 4b of the taper rollers 4 so that the cage 10 can be positioned axially by the end surfaces 4a and 4b of the taper rollers 4.

In addition, as shown in FIG. 2, in the cage 10, radially outer side surfaces 13a of the pillar portions 13 are formed into taper surface shapes extending along the outer ring raceway surface 3a respectively. When the inner ring 2 and the outer ring 3 rotate relatively to each other, the cage 10 rotates circumferentially while allowing the outer side surfaces 13a of the pillar portions 13 to slide-contact the outer ring raceway surface 3.

That is, the cage 10 in this embodiment slide-contacts the outer ring raceway surface 3a so as to be positioned radially by the outer ring raceway surface 3a.

In this manner, in the embodiment, the outer side surfaces 13a of the pillar portions 13 slide-contacting the outer ring raceway portion 3a form second sliding surfaces so that the cage 10 can be positioned radially by the outer ring raceway surface 3a.

The small diameter annular portion 11 is an annular part formed to be comparatively thick. The small diameter annular portion 11 is disposed between a small collar portion 5 provided on the one axial end side of the inner ring 2 and an one axial end portion 6 of the outer ring 3, so as to close a one end side annular opening portion A1 formed by the small collar portion 5 and the one axial end portion 6 of the outer ring 3.

An inner circumferential surface 11a of the small diameter annular portion 11 is formed into a substantially cylindrical shape so as to form a slight gap between the inner circumferential surface 11a and the outer circumferential surface 5a of the small collar portion 5.

An outer circumferential surface 11b of the small diameter annular portion 11 is formed into a taper surface along the outer side surfaces 13a of the pillar portions 13 so as to form a slight gap between the outer circumferential surface 11b and the inner circumferential surface 6a of the one axial end portion 6.

In this manner, the small diameter annular portion 11 closes the one side annular opening portion A1 while securing slight gaps between the small diameter annular portion 11 and the small collar portion 5 and between the small diameter annular portion 11 and the one axial end portion 6 of the outer ring 3 respectively.

The slight gaps on the one axial end side formed to close the one end side annular opening portion A1 serve as inlets through which lubricating oil for lubricating the taper roller bearing 1 can flow into the bearing.

That is, when the inner and outer rings 2 and 3 rotate relatively in the taper roller bearing 1, a pumping action to make the lubricating oil inside the bearing flow from a smaller diameter part to a larger diameter part on each raceway surface 2a, 3a appears due to the centrifugal force of each ring 2, 3.

Due to the pumping action, the lubricating oil flows into the taper roller bearing 1 through the one end side annular opening portion A1. Thus, the slight gaps on the one axial end side serve as inlets through which the lubricating oil for lubricating the taper roller bearing 1 can flow into the bearing.

Here, when the lubricating oil flowing into the bearing reaches a required amount or more, the rotational torque of the taper roller bearing 1 may be increased by agitating resistance or viscous resistance of the lubricating oil.

As for this point, in this embodiment, the small diameter annular portion 11 closes the one end side annular opening portion A1 while securing slight gaps between the small diameter annular portion 11 and the small collar portion 5 and between the small diameter annular portion 11 and the one axial end portion 6 of the outer ring 3 respectively, so that the lubricating oil can be limited from flowing into the bearing through the one end side annular opening portion A1 more than necessary. Thus, it is possible to suppress increase in agitating resistance or the like caused by excessive lubricating oil. In this manner, the rotational torque of the taper roller bearing 1 can be reduced.

The large diameter annular portion 12 is also an annular part formed to be comparatively thick, in the same manner as the small diameter annular portion 11. The large diameter annular portion 12 is disposed between a large collar portion 7 provided on the other axial end side of the inner ring 2 and the other axial end portion 8 of the outer ring 3 so as to close the other end side annular opening portion A2 formed by the large collar portion 7 and the other axial end portion 8 of the outer ring 3.

A cut portion 15 in which the outer circumferential end portion of the large diameter annular portion 12 is cut circumferentially and entirely is formed on the outer circumferential side of the large diameter annular portion 12.

Figure 3:
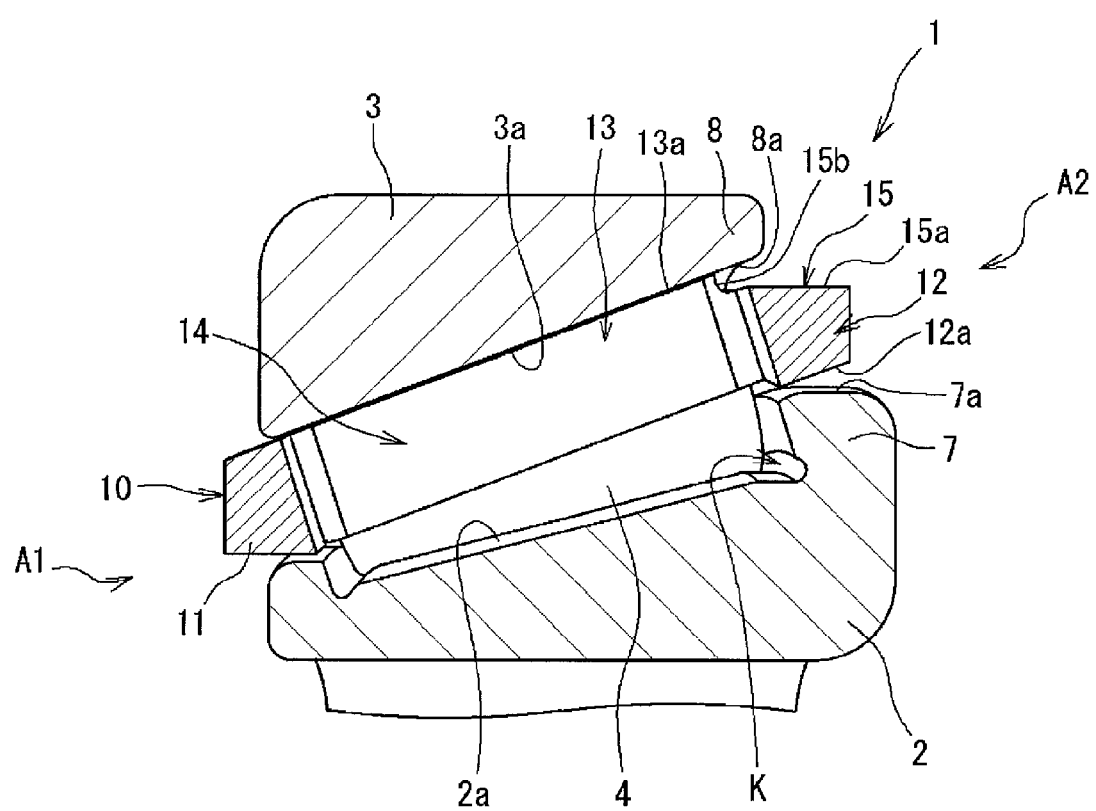
FIG. 3 is a sectional view of the taper roller bearing, from which taper rollers are omitted for the sake of explanation of a form of a cut portion.

FIG. 3 is a sectional view of the taper roller bearing, from which the taper rollers are omitted for the sake of explanation of the form of the cut portion 15.

Refer to FIG. 2 as well as FIG. 3. The cut portion 15 is formed by cutting the large diameter annular portion 12 radially inward from the axially outer side edge thereof so as to reach the outer circumferential end portions of the pillar portions 13 beyond the outer circumferential edges of the pockets 14. The cut portion 15 is formed by a cylindrical surface 15a formed into a substantially cylindrical shape, and a step surface 15b extending from the cylindrical surface 15a and reaching the edges of the outer side surfaces 13a of the pillar portions 13.

As shown in FIG. 3, the outer circumferential edges of the pockets 14 on the other axial end side are cut radially inward in the cut portion 15. If the cut portion 15 is not formed, the outer circumferential edges of the pockets 14 on the other axial end side will be closed from the outside of the bearing by the large diameter annular portion 12 and the outer ring raceway surface 3a. In this embodiment, however, due to the cut portion 15 in which the outer circumferential edges of the pockets 14 on the other axial end side are cut radially inward, the other axial end sides of the pockets 14 are opened to the outside of the bearing.

Thus, the lubricating oil flowing into the pockets 14 along the outer ring raceway surface 3a can be discharged to the outside of the bearing through the cut portion 15 quickly.

The cylindrical surface 15a of the cut portion 15 forms a gap between the cylindrical surface 15a and an inner circumferential surface 8a of the other axial end portion 8 in the outer ring 3.

In addition, an inner circumferential surface 12a of the large diameter annular portion 12 is formed as a taper surface along the inner circumferential surfaces of the pillar portions 13 so as to form a slight gap between the inner circumferential surface 12a and an outer circumferential surface 7a of the large collar portion 7.

In this manner, the large diameter annular portion 12 closes the other end side annular opening portion A2 while securing slight gaps between the large diameter annular portion 12 and the large collar portion 7.

The slight gaps formed on the other axial end side by closing the other end side annular opening portion A2 serve as discharge ports for the lubricating oil flowing into the bearing due to the pumping action.

That is, the lubricating oil flowing into the bearing due to the pumping action is used for lubricating the inside of the bearing and discharged through the other end annular opening portion A2. Thus, the slight gaps on the other axial end side serve as discharge ports for the lubricating oil flowing into the bearing due to the pumping action.

In the embodiment, the large diameter annular portion 12 closes the other end side annular opening portion A2 while securing slight gaps between the large diameter annular portion 12 and the large collar portion 7, so that the lubricating oil flowing into the taper roller bearing 1 can be limited from being discharged to the outside of the bearing through the other end side annular opening portion A2 more than necessary.

Particularly, the discharge of the lubricating oil is limited by the large collar portion 7 so that the lubricating oil can be retained near a contact portion between the large collar portion 7 and the large diameter side end surface 4b of each taper roller 4 sliding on each other, that is, near a corner portion K (see FIG. 3) in which the inner ring raceway surface 2a and the large collar portion 7 are connected. As a result, sliding friction between the large collar portion 7 and each taper roller 4 can be reduced while occurrence of burning or the like can be suppressed.

Incidentally, it is necessary to retain the lubricating oil on the inner ring 2 side including the large collar portion 7. On the other hand, on the outer ring 3 side, it is necessary to suppress increase in agitating resistance, viscous resistance, etc. caused by the lubricating oil.

As for this point, in this embodiment, the outer circumferential edges of the pockets 14 are cut radially inward so that the cut portion 15 through which the lubricating oil can be discharged from the inside of the bearing can be formed on the outer circumferential side of the large diameter annular portion 12. Thus, the lubricating oil that wants to be discharged to the outside of the bearing along the outer ring raceway surface 3a can be discharged to the outside quickly.

In this manner, the lubricating oil can be retained moderately on the inner ring 2 side inside the bearing while increase in agitating resistance etc. caused by excessive lubricating oil can be suppressed on the outer ring 3 side. As a result, the rotational torque of the taper roller bearing can be further reduced while occurrence of burning or the like between the large collar portion and each taper roller can be suppressed.

Figure 4:
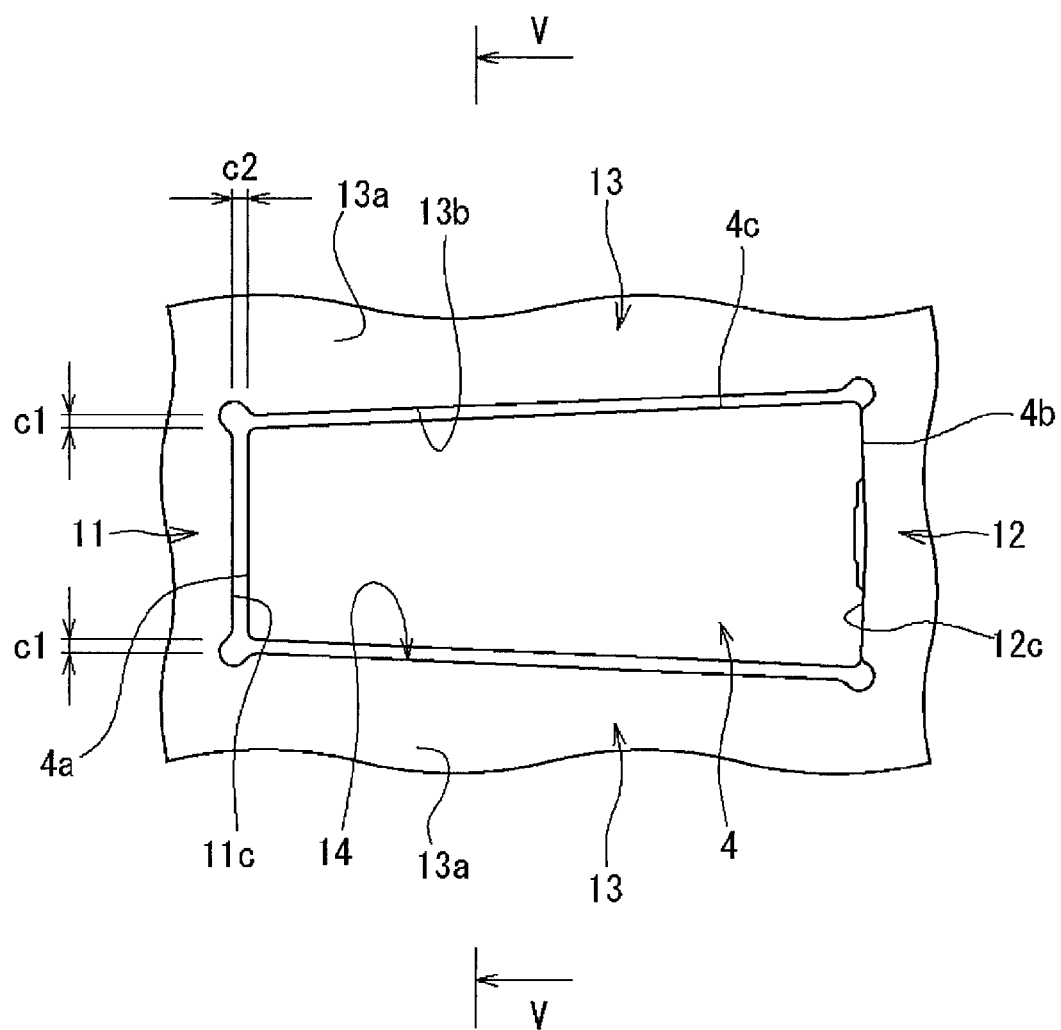
FIG. 4 is an outline view in which a pocket of the cage is observed radially from outside.

FIG. 4 is an outline view in which a pocket 14 of the cage 10 is observed radially from outside.

As shown in FIG. 4, a predetermined clearance $c_1$ is provided circumferentially in the pocket 14 with respect to (radially opposite sides of) a rolling surface 4c of the taper roller 4 received in the pocket 14.

In addition, a predetermined clearance $c_2$ is provided axially with respect to the opposite end surfaces of the taper roller 4.

In the taper roller bearing 1 according to the embodiment, the cage 10 is positioned axially by the annular portion side surfaces 11c and 12c (first sliding surfaces) of the two annular portions 11 and 12.

In addition, the pillar portions 13 are provided with the outer side surfaces 13a (second sliding surfaces) with which the cage 10 can be positioned radially by the outer ring raceway surface 3a. Thus, the cage 10 can be positioned radially stably by the outer ring raceway surface 3a. Therefore, the cage 10 does not have to be positioned by the plurality of taper rollers 4, but the moderate clearances $c_1$ and $c_2$ can be provided between each pocket 14 and each taper roller 4 as shown in FIG. 4. Due to the clearances $c_1$ and $c_2$, each pillar portion 13 is suppressed from always slide-contacting each taper roller 4 so that sliding friction between the pillar portion 13 and the taper roller 4 can be reduced. In addition, the pillar portion 13 can be suppressed from being bitten by the taper roller 4. Thus, the rotational torque of the taper roller bearing 1 can be reduced.

Further, since each pillar portion 13 is suppressed from being bitten by each taper roller 4 as described above, the pillar portion 13 can be suppressed from being caught by the taper roller 4 even if the taper roller bearing 1 rotates at a high velocity. As a result, the taper roller bearing 1 can be rotated at a higher velocity.

In this manner, according to the taper roller bearing 1 in this embodiment, the rotational torque can be reduced and the taper roller bearing 1 can be rotated at a higher velocity.

Incidentally, the clearances $c_1$ and $c_2$ are set to be wide enough to suppress each taper roller 4 from biting in each pocket 14 and to suppress each taper roller 4 from catching each pillar portion 13. For example, the clearances $c_1$ and $c_2$ are set at about tenths of millimeters.

Figure 5:
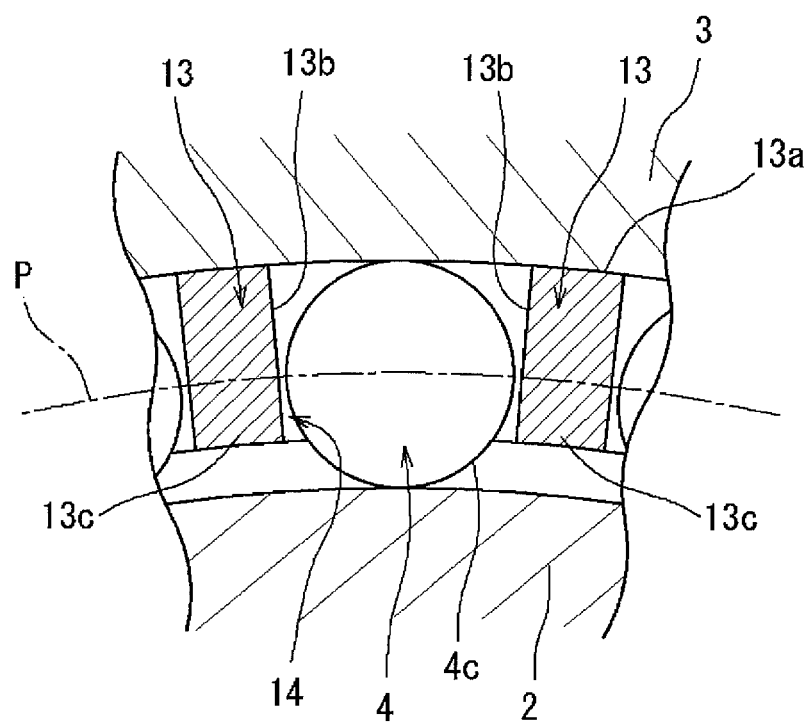
FIG. 5 is a sectional view taken on line V-V in FIG. 4.

FIG. 5 is a sectional view taken on line V-V in FIG. 4, showing a radial section of a main portion of the cage 10.

In each pillar portion 13 forming a pocket 14, a pillar portion side surface 13b facing the inside of the pocket 14 is formed substantially linearly along the radial direction as shown in FIG. 5.

In addition to the clearances $c_1$ and $c_2$ provided for a taper roller 4 in the pocket 14 as described above, the pillar portion side surface 13b is formed substantially linear along the radial direction, so that the taper roller can be separated from another taper roller adjacent thereto by the pillar portion 13 while the contact surface between the pillar portion side surface 13b of the pillar portion 13 and the rolling surface 4c of the taper roller 4 can be reduced to be as small as possible. As a result, the frictional resistance between the two can be further reduced.

In addition, a radially inner tip end 13c of the pillar portion 13 is located on the radially inner side of a pitch circle P formed by the axis of the taper roller 4 as shown in FIG. 5.

In this case, the taper rollers 4 adjacent to each other can be retained at a distance from each other surely by the pillar portion 13, for example, as compared with the case in which the tip end 13c of the pillar portion 13 is located on the radially outer side of the pitch circle P.

Incidentally, the invention is not limited to the above-described embodiment. The case where the inner circumferential surface 12a in the large diameter annular portion 12 of the cage 10 is formed as a taper surface along the inner circumferential surfaces of the pillar portions 13 has been illustrated in the embodiment by way of example. However, for example, the inner circumferential surface 12a may be formed into a cylindrical shape slide-contacting the outer circumferential surface 7a of the large collar portion 7 as shown in FIG. 6.

In this case, the inner circumferential surface 12a serving as a third sliding surface slide-contacts the outer circumferential surface 7a of the large collar portion 7 so that the cage 10 can be positioned radially by the outer circumferential surface 7a of the large collar portion 7.

Accordingly, the cage 10 can be positioned radially by both the outer ring raceway surface 3a and the outer circumferential surface 7a of the large collar portion 7 so that the cage 10 can be positioned more stably.

Figure 6:
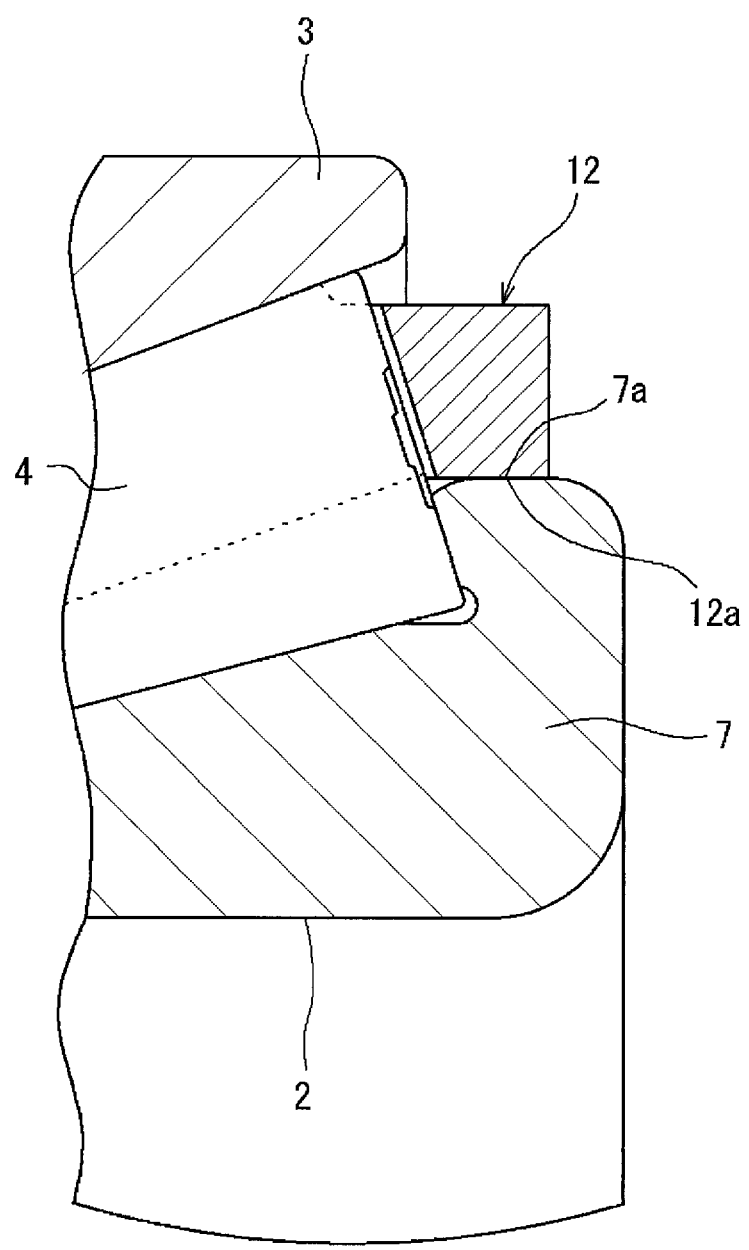
FIG. 6 is a main portion sectional view showing a modification of a large diameter annular portion.
Figure 7:
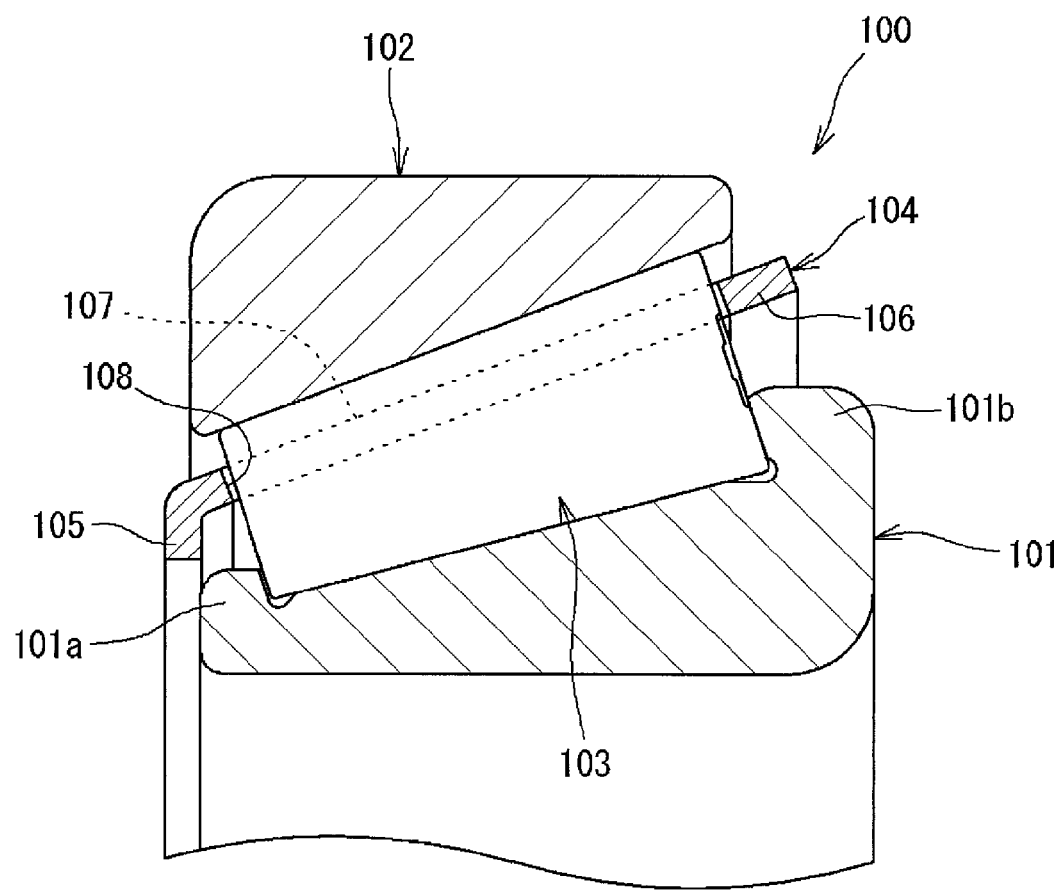
FIG. 7 is an axially sectional view showing a related-art taper roller bearing.
Figure 8:
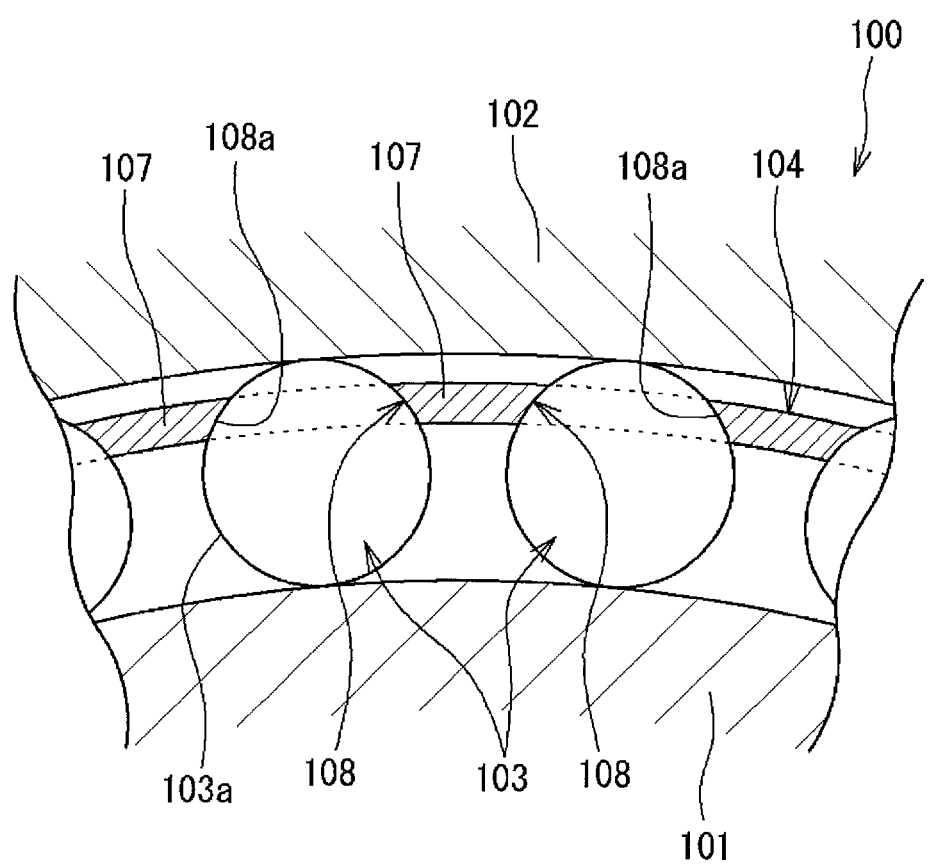
FIG. 8 is a radially sectional view of the related-art taper roller bearing.

Further, in the case of FIG. 6, the gap between the inner circumferential surface 12a of the large diameter annular portion 12 and the outer circumferential surface 7a of the large collar portion 7 is substantially closed so that the lubricating oil inside the bearing can be further limited from being discharged from the inner ring 2 side. In comparison with the case of the embodiment, more lubricating oil can be retained near the contact portion between the large collar portion 7 and the large diameter side end surface 4b of each taper roller 4.

The present application is based on a Japanese patent application (Japanese Patent Application No. 2013-090440) filed on Apr. 23, 2013, the contents of which are incorporated herein by reference.

DESCRIPTION OF REFERENCE SIGNS

1: Taper Roller Bearing
2: Inner Ring
2a: Inner Ring Raceway Surface
3: Outer Ring
3a: Outer Ring Raceway Surface
4: Taper Roller
4a,4b: End Surface
5: Small Collar Portion
6: One Axial End Portion
7: Large Collar Portion
8: The Other Axial End Portion
10: Cage
11: Small Diameter Annular Portion
11c: Annular Portion Side Surface
12: Large Diameter Annular Portion
12c: Annular Portion Side Surface
13: Pillar Portion
13a: Outer Side Surface
13b: Pillar Portion Side Surface
14: Pocket
15: Cut Portion
A1: One End Side Annular Opening Portion
A2: The Other End Side Annular Opening Portion

The invention claimed is:

1. A taper roller bearing comprising:
an inner ring comprising an inner ring raceway surface;
an outer ring which is disposed on an outer circumferential side of the inner ring and coaxially with the inner ring and which comprises an outer ring raceway surface opposing the inner ring raceway surface;
a plurality of taper rollers rotatably arranged between the inner ring raceway surface and the outer ring raceway surface; and
a cage which comprises a first diameter annular portion, a second diameter annular portion opposing the first diameter annular portion at a predetermined distance therefrom, the second diameter annular portion being larger in diameter than the first diameter annular portion, and a plurality of pillar portions which connect the first diameter and the second diameter annular portions such that spaces each surrounded by adjacent ones of the pillar portions and by the first diameter and the second diameter annular portions are formed as pockets receiving the taper rollers, respectively,
wherein as viewed in a radial direction, a clearance is provided circumferentially in the pocket with respect to a rolling surface of each of the taper rollers,
wherein a first sliding surface is provided in at least one of the annular portions to slide-contact end surfaces of the taper rollers so as to axially position the cage by the end surfaces of the taper rollers,
wherein second sliding surfaces are provided in the pillar portions to slide-contact the outer ring raceway surface so as to radially position the cage by the outer ring raceway surface, and
wherein an axial end of the pillar portions approximate the second diameter annular portion includes a step portion that forms a cut portion, wherein in the step portion the pillar portions do not slide-contact the outer ring raceway surface by way of the step portion extending radially inward from an outer circumferential surface of the pillar portions that is in slide-contact with the outer ring raceway surface, the cut portion extending axially from the step portion of the pillar portions into an outer circumferential side of the second diameter annular portion, such that lubricating oil for lubricating between the inner and outer rings is allowed to be discharged from an inside of the bearing via the cut portion.

2. The taper roller bearing according to claim 1, wherein the first diameter annular portion is located at an annular opening portion formed by a collar portion provided on one axial end side of the inner ring and one axial end portion of the outer ring, with gaps secured between the first diameter annular portion and the collar portion and between the first diameter annular portion and the one axial end portion of the outer ring.

3. The taper roller bearing according to claim 1, wherein the second diameter annular portion is located at an annular opening portion formed by a collar portion provided on an axial end side of the inner ring and an axial end portion of the outer ring, with a gap secured between the second diameter annular portion and the collar portion.

4. The taper roller bearing according to claim 3, wherein a third sliding surface is provided on an inner circumferential side of the second diameter annular portion to slide-contact an outer circumferential surface of the collar portion so as to radially position the cage by the outer circumferential surface of the collar portion.

5. The taper roller bearing according to claim 1, wherein inner side surfaces of the pillar portions facing an inside of the pockets are formed substantially linearly along a radial direction.

6. The taper roller bearing according to claim 5, wherein radially inner tip ends of the pillar portions are located on a radially inner side of a pitch circle formed by axes of the taper rollers.

\* \* \* \* \*